United States Patent
Kasparick et al.

(10) Patent No.: US 11,477,772 B2
(45) Date of Patent: Oct. 18, 2022

(54) RECEIVER, TRANSMITTER, RADIO SIGNAL, WIRELESS COMMUNICATION NETWORK AND METHOD TO PROVIDE PARAMETERS FOR A COMMUNICATION OF THE RECEIVER WITH THE WIRELESS

(71) Applicant: Fraunhofer-Gesellschaft zur Foerderung der angewandten Forschung e.V., Munich (DE)

(72) Inventors: Martin Kasparick, Berlin (DE); Renato Cavalcante, Berlin (DE); Slawomir Stanczak, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 30 days.

(21) Appl. No.: 16/387,429

(22) Filed: Apr. 17, 2019

(65) Prior Publication Data
US 2019/0254011 A1    Aug. 15, 2019

Related U.S. Application Data

(63) Continuation of application No. PCT/EP2016/075363, filed on Oct. 21, 2016.

(51) Int. Cl.
*H04W 72/04* (2009.01)
*H04W 4/02* (2018.01)
(Continued)

(52) U.S. Cl.
CPC ........... *H04W 72/042* (2013.01); *G01S 19/24* (2013.01); *H04L 5/0007* (2013.01); *H04L 67/52* (2022.05);
(Continued)

(58) Field of Classification Search
CPC ... H04W 24/10; H04W 72/042; H04W 4/021; H04W 4/023; H04W 64/00; H04W 76/27;
(Continued)

(56) References Cited

U.S. PATENT DOCUMENTS

| 10,721,119 B2* | 7/2020 | Chen ..................... H04L 5/1469 |
| 2002/0072369 A1* | 6/2002 | Sasada .................. H04W 60/04 |
| | | 455/435.2 |

(Continued)

FOREIGN PATENT DOCUMENTS

CN      111866940 A   *   10/2020      ........... H04L 47/125

OTHER PUBLICATIONS

L1/L2 Control Channel Structure with CDM Based Multiplexing in E-UTRA Downlink, 3GPP TSG RAN WG1 Meeting #47, Riga, Latvia, Nov. 6-10, 2006, R1-063349 (Year: 2006).*

(Continued)

*Primary Examiner* — Nizar N Sivji
*Assistant Examiner* — Jing Gao
(74) *Attorney, Agent, or Firm* — Perkins Coie LLP; Michael A. Glenn

(57) ABSTRACT

A receiver receives a radio signal broadcast by a transmitter of a wireless communication network. The transmitter serves a cell of the wireless communication network in which the receiver is located. The radio signal has a plurality of configuration messages. Each configuration message includes information defining at least one location in the cell and parameters for a communication of the receiver with the wireless communication network. The parameters is associated with the certain location. The receiver determines the parameters for the communication of the receiver with the wireless communication network using a position of the receiver in the cell and the plurality of configuration messages.

22 Claims, 4 Drawing Sheets

(51) Int. Cl.

| | |
|---|---|
| *H04W 8/24* | (2009.01) |
| *H04W 60/00* | (2009.01) |
| *H04W 48/10* | (2009.01) |
| *H04W 48/18* | (2009.01) |
| *H04L 67/52* | (2022.01) |
| *H04W 76/10* | (2018.01) |
| *G01S 19/24* | (2010.01) |
| *H04L 5/00* | (2006.01) |
| *H04W 64/00* | (2009.01) |
| *H04W 48/12* | (2009.01) |

(52) U.S. Cl.
CPC ............. *H04W 4/02* (2013.01); *H04W 4/023* (2013.01); *H04W 8/24* (2013.01); *H04W 48/10* (2013.01); *H04W 48/18* (2013.01); *H04W 60/00* (2013.01); *H04W 64/003* (2013.01); *H04W 76/10* (2018.02); *H04W 48/12* (2013.01)

(58) Field of Classification Search
CPC ......... H04W 4/029; H04W 4/21; H04W 4/80; H04W 4/022; H04W 72/048; H04W 36/08; H04W 48/04; H04W 64/003; H04W 72/0446; H04W 74/006; H04W 88/02; H04W 8/245; H04W 24/02; H04W 36/32; H04W 48/10; H04W 48/12; H04W 4/02; H04W 88/08; H04W 16/14; H04W 28/0231; H04W 36/0077; H04W 36/14; H04W 36/16; H04W 36/18; H04W 4/18; H04W 52/0206; H04W 52/0209; H04W 52/0212; H04W 52/0229; H04W 72/04; H04W 72/044; H04W 72/0453; H04W 76/10; H04W 76/40; H04W 92/10; H04W 8/24; H04W 48/18; H04W 60/00; G01S 19/24; H04L 5/007; H04L 67/18

See application file for complete search history.

(56) References Cited

U.S. PATENT DOCUMENTS

| | | | | |
|---|---|---|---|---|
| 2014/0323108 | A1* | 10/2014 | Doubek | H04W 64/00 455/418 |
| 2015/0215884 | A1* | 7/2015 | Horvat | G01S 5/0294 370/328 |
| 2016/0219579 | A1* | 7/2016 | Yamazaki | H04L 5/0048 |

OTHER PUBLICATIONS

"5G Waveform & Multiple Access Techniques", [A]—Qualcomm, (Nov. 4, 2015), pp. 1-46, URL: https://www.qualcomm.com/media/documents/files/5g-research-onwaveform-and-multiple-access-techniques.pdf, (Feb. 21, 2017), XP055348124 [A] 25,26 *the whole document *, Nov. 4, 2015, pp. 1-46.

"L1/L2 Control Channel Structure with CDM Based Multiplexing in E-UTRA Downlink", [Y]—Kddi et al, 3GPP Draft; R1-063349, 3rd Generation Partnership Project (3GPP), Mobile Competence Centre ; 650, Route Des Lucioles ; F-06921 Sophia-Antipolis Cedex ; France, (Nov. 2, 2006), vol. RAN WG1, No. Riga, Latvia Nov. 2, 2006, XP050103792 [Y], 18,19 * p. 3; figure 2 *, Nov. 2, 2006, pp. 1-7.

Donovan, James, "Cells, Sectors and Antenna Beamforming | CommScope", (May 28, 2014), URL: http://www.commscope.com/Blog/Cells--Sectors-and-Antenna-Beamforming/, (Mar. 16, 2017), XP055355812 [A] 1-30 * the whole document *, May 28, 2014, pp. 1-30.

* cited by examiner

RECEIVER, TRANSMITTER, RADIO SIGNAL, WIRELESS COMMUNICATION NETWORK AND METHOD TO PROVIDE PARAMETERS FOR A COMMUNICATION OF THE RECEIVER WITH THE WIRELESS

CROSS-REFERENCE TO RELATED APPLICATION

This application is a continuation of copending International Application No. PCT/EP2016/075363, filed Oct. 21, 2016, which is incorporated herein by reference in its entirety.

BACKGROUND OF THE INVENTION

The present invention concerns the field of wireless communication networks or systems, and more specifically the transmission of control information from a base station to one or more receivers located within a cell of the wireless communication network, which is served by the transmitter. Examples describe a geographic radio resource management configuration signaling.

FIG. 1 is a schematic representation of an example of a network infrastructure, such as a wireless communication network or wireless communication system, including a plurality of base stations $eNB_1$ to $eNB_5$, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $100_2$ and that are served by base station $eNB_2$. Another user $UE_3$ is shown in cell $100_4$ which is served by base station $eNB_4$. The arrows $102_1$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $104_1$ and $104_2$ in cell $100_4$, which may be stationary or mobile devices. The IoT device $104_1$ accesses the wireless communication system via the base station $eNB_4$ to receive and transmit data as schematically represented by arrow $106_1$. The IoT device $104_2$ accesses the wireless communication system via the user $UE_3$ as is schematically represented by arrow $106_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used.

In a wireless communication network as it is, for example, depicted in FIG. 1, a plurality of mobile devices or UEs may be present within a cell. With an increasing number of mobile devices, control channels may become a bottleneck to serve mobile users. Due to the limited number of resources available to the control channels, providing a wireless connectivity in crowded areas of the cell, for example within a crowded train, may be difficult. There may not be enough resources available to coordinate the large number of UEs. In a cellular system, such as the one shown in FIG. 1, radio resource management (RRM) configuration settings may be transmitted to specific users directly, however, this leads to a high communication overhead because connectivity between each user and the base station is needed. In accordance with other examples, the radio resource management configuration settings may be set to the same values for all users within a cell, either through configuration messages or through a standardized procedure. The radio resource management mechanism in 3GPP Release 10 are described in reference [1] (see chapter 22). The procedure that determines how to select the transmit power in random access messages may be the same and fixed for all users that attempt to register at the base station. For example, all users start from the same transmit power to register at the base station. If the registration is not successful, the transmit power is increased by a predefined value. This procedure is repeated until the registration is successful or until a maximum power value is reached. Thus, UEs experiencing a bad channels may need a long time to complete the registration procedure, in addition to wasting energy due to the failed messages.

SUMMARY

An embodiment may have a receiver, wherein the receiver is configured to receive a radio signal broadcast by a transmitter of a wireless communication network, the transmitter serving a cell of the wireless communication network in which the receiver is located, the radio signal has a plurality of configuration messages, each configuration message including information defining at least one location in the cell and parameters for a communication of the receiver with the wireless communication network, the parameters being associated with the certain location, and the receiver is configured to determine the parameters for the communication of the receiver with the wireless communication network using a position of the receiver in the cell and the plurality of configuration messages.

Another embodiment may have a transmitter, wherein the transmitter is configured to broadcast a radio signal to one or more receivers in a cell of a wireless communication network, the transmitter serving the cell of the wireless communication network in which the receivers are located, and the radio signal has a plurality of configuration messages, each configuration message including information defining at least one location in the cell and parameters for a communication of a receiver with the wireless communication network, the parameters being associated with the certain location.

According to another embodiment, a radio signal may have a plurality of configuration messages, wherein each configuration message includes information defining at least one location in a cell of a wireless communication network and parameters for a communication of a receiver with the wireless communication network, the parameters being associated with the certain location, and wherein the radio signal is to be broadcast by a transmitter of the wireless communication network to one or more receivers in the cell, the cell being served by the transmitter.

According to another embodiment, a wireless communication network may have: the inventive receiver; and the inventive transmitter.

According to another embodiment, a method may have the steps of: receiving, by a receiver of a wireless communication network, a radio signal broadcast by a transmitter of the wireless communication network, the transmitter serving a cell of the wireless communication network in which the receiver is located, wherein the radio signal has a plurality of configuration messages, each configuration message including information defining at least one location in the cell and parameters for a communication of the receiver with the wireless communication network, the parameters being associated with the certain location, and determining, by the receiver, the parameters for the communication of the receiver with the wireless communication network using a position of the receiver in the cell and the plurality of configuration messages.

According to another embodiment, a method may have the steps of: broadcasting, by a transmitter of a wireless communication network, a radio signal to one or more receivers in a cell of the wireless communication network, the transmitter serving the cell of the wireless communication network in which the receivers are located, wherein the radio signal has a plurality of configuration messages, each configuration message including information defining at least one location in the cell and parameters for a communication of a receiver with the wireless communication network, the parameters being associated with the certain location.

According to another embodiment, a method may have the steps of: broadcasting, by a transmitter of a wireless communication network, a radio signal to one or more receivers in a cell of the wireless communication network, the transmitter serving the cell of the wireless communication network in which the receivers are located, wherein the radio signal has a plurality of configuration messages, each configuration message including information defining at least one location in the cell and parameters for a communication of a receiver with the wireless communication network, the parameters being associated with the certain location; receiving, by a receiver of the wireless communication network, the radio signal broadcast by the transmitter; and determining, by the receiver, the parameters for the communication of the receiver with the wireless communication network using a position of the receiver in the cell and the plurality of configuration messages.

Another embodiment may have a non-transitory digital storage medium having a computer program stored thereon to perform the method having the steps of: receiving, by a receiver of a wireless communication network, a radio signal broadcast by a transmitter of the wireless communication network, the transmitter serving a cell of the wireless communication network in which the receiver is located, wherein the radio signal has a plurality of configuration messages, each configuration message including information defining at least one location in the cell and parameters for a communication of the receiver with the wireless communication network, the parameters being associated with the certain location, and determining, by the receiver, the parameters for the communication of the receiver with the wireless communication network using a position of the receiver in the cell and the plurality of configuration messages, when said computer program is run by a computer.

Another embodiment may have a non-transitory digital storage medium having a computer program stored thereon to perform the method having the steps of: broadcasting, by a transmitter of a wireless communication network, a radio signal to one or more receivers in a cell of the wireless communication network, the transmitter serving the cell of the wireless communication network in which the receivers are located, wherein the radio signal has a plurality of configuration messages, each configuration message including information defining at least one location in the cell and parameters for a communication of a receiver with the wireless communication network, the parameters being associated with the certain location, when said computer program is run by a computer.

Another embodiment may have a non-transitory digital storage medium having a computer program stored thereon to perform the method having the steps of: broadcasting, by a transmitter of a wireless communication network, a radio signal to one or more receivers in a cell of the wireless communication network, the transmitter serving the cell of the wireless communication network in which the receivers are located, wherein the radio signal has a plurality of configuration messages, each configuration message including information defining at least one location in the cell and parameters for a communication of a receiver with the wireless communication network, the parameters being associated with the certain location; receiving, by a receiver of the wireless communication network, the radio signal broadcast by the transmitter; and determining, by the receiver, the parameters for the communication of the receiver with the wireless communication network using a position of the receiver in the cell and the plurality of configuration messages, when said computer program is run by a computer.

BRIEF DESCRIPTION OF THE DRAWINGS

Embodiments of the present invention will be detailed subsequently referring to the appended drawings, in which.

DETAILED DESCRIPTION OF THE INVENTION

The present invention improves the distribution of control information to mobile users or UEs in a wireless communication network, in that a direct transmission of control information to individual UEs is avoided. The base station may broadcast configuration maps, also referred to as configuration messages, that contain information providing UEs with transmission parameters as a function of the geographic location of the UEs. In accordance with the examples, broadcasting the configuration messages may use a lossless transmission scheme or a lossy transmission scheme. The transmission parameters broadcast by the configuration messages may take into consideration the radio condition in specific areas of a cell served by the base station so that for the respective areas or locations within a cell the parameters may reduce the time to access the network and save energy. For example by providing a suitable initial transmit power to be used by a UE, the time to complete the registration procedure and the waste of energy may be reduced. In accordance with examples, individual control messages are avoided and uplink connectivity from the receiver to the base station is not required. An arbitrary number of UEs may configure their transmission parameters based on the geographic location of the UE and information received from the base station. In other words, the inventive approach provides a geographic or location aware RRM configuration scheme that is designed for particular locations, areas or regions of the cell, rather than for particular users. Such a scheme is not implemented in conventional approaches.

The inventive approach is advantageous as, from the perspective of a base station, the radio resource management settings may be sent to an arbitrary number of devices without the need to establish a connection. For the UEs, impractical configurations may be avoided, thereby improving the overall quality of service, for example the time and energy spent to register to a base station may be decreased. In accordance with examples, the inventive approach may be provided for a location aware assignment of transmit power values in an uplink to support a connection establishment and re-establishment mechanism. Potential applications of location aware communication on PHY, MAC and network layers are described in reference [2].

Figure 1:
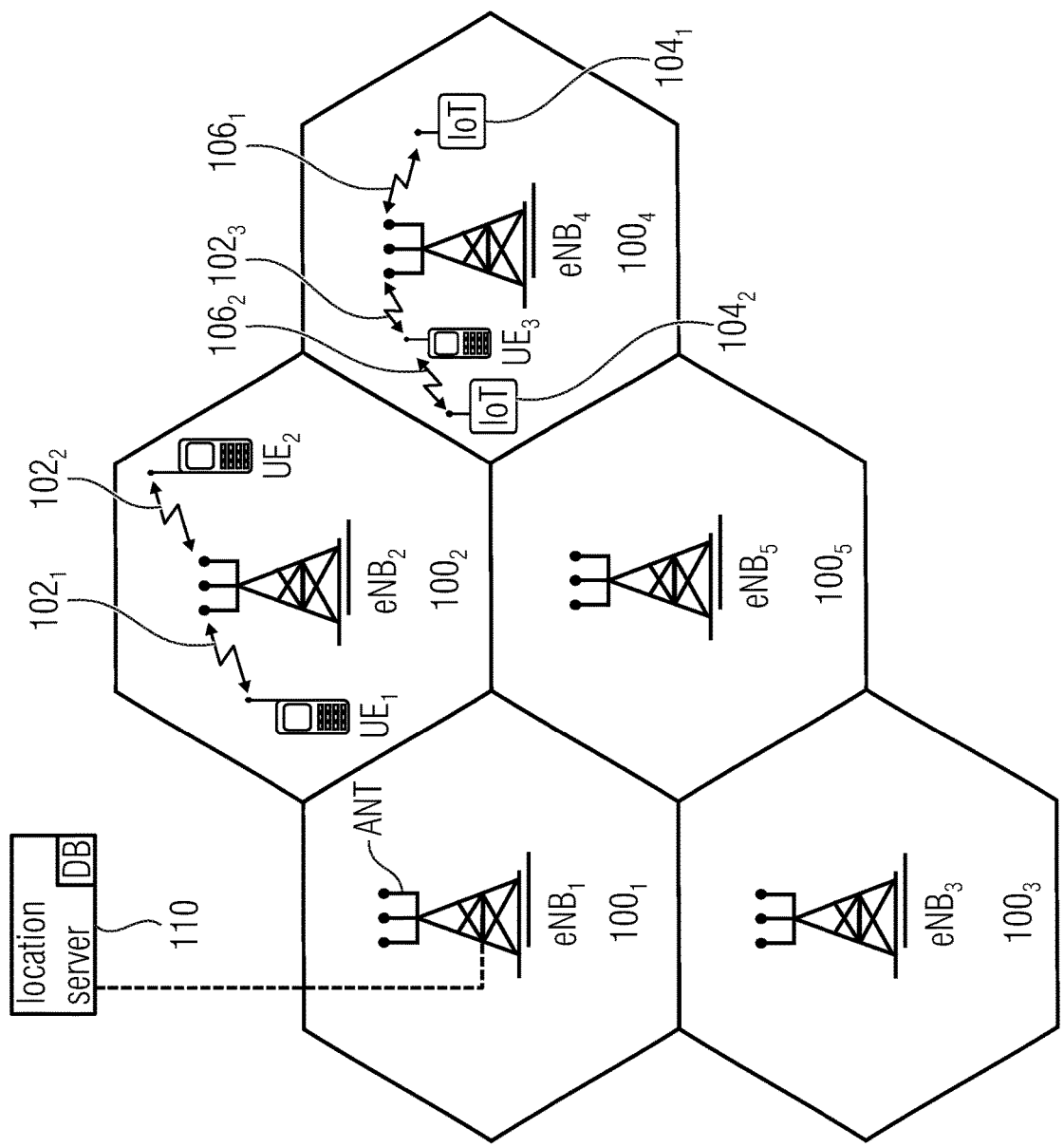
FIG. 1 shows a schematic representation of an example of a wireless communication system.
Figures 2, 3:
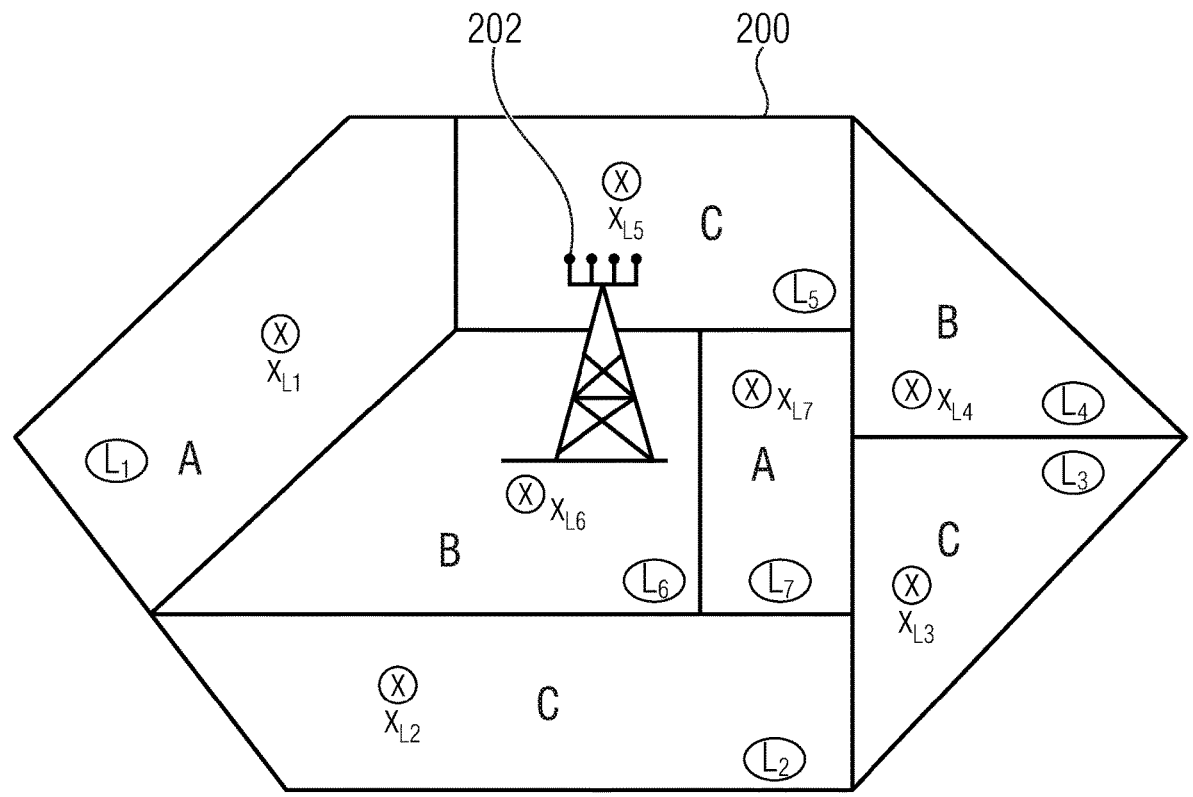
FIG. 2 shows an example of a cell of a wireless communication network of FIG. 1 indicating schematically different coordinates/locations in the cell having associated therewith respective location dependent control parameters in accordance with embodiments of the inventive approach.
FIG. 3 is an example of a data signal in accordance with embodiments of the inventive approach, which is broadcast by the base station in FIG. 2, and which includes location information as well as information about an RRM parameter set.

FIG. 2 shows an example of a cell of a wireless communication network, as it is, for example, depicted in FIG. 1. The cell 200 is served by a base station 202, and within the cell 200 one or more UEs may be located. In FIG. 2, the UEs to be served by the base station 202 are not shown. On the basis of information about the radio conditions within respective areas or regions of the cell 200, which may be provided on the basis of radio maps generated for the cell 200, respective areas $L_1$ to $L_7$ of the cell 200 are identified in which the same or substantially the same radio conditions exist. In the example of FIG. 2, it is assumed that the regions $L_1$ and $L_7$ have substantially the same radio conditions so that the same RRM parameter set A may be determined to be used for these regions. In a similar way, the regions $L_4$, $L_6$ have assigned therewith the RRM parameter set B, and regions $L_2$, $L_3$, $L_5$ have assigned thereto the RRM parameter set C. The base station 202 generates a broadcast signal that may be sent over a broadcast channel of the wireless communication network, for example when considering the LTE standard, the signal may be sent over the PBCH (physical broadcast channel). The signal includes one or more control messages that may be received by any of the UEs located within the cell 200. While the base station 202 serves the cell 200, i.e. provides the possibility for establishing a wireless connection between the UEs and the base station 202, in accordance with the inventive approach, for providing the control information to the respective UEs know connectivity between a UE and the base station 202 is not required, rather, the control information, by means of the control message, is broadcast by the base station 202 and may be received by the respective UEs.

FIG. 3 is an example of a data signal broadcast by the base station 202 in FIG. 2, and the data signal 300 includes location information 302 as well as information about an RRM parameter set 304. The location information indicates those areas/regions of the cell 200 having assigned thereto a specific RRM parameter set. Responsive to broadcasting the data signal 300 by the base station 202, a UE within the cell 200 may determine its location within the cell 200 and, dependent on its location, select from the data signal 300 the associated RRM parameter set 304 to be used for controlling a communication of the UE with the base station 202. For example, a UE located in location $L_1$ may determine its location and then select the RRM parameter set A as most suitable parameter set for the communication in view of the specific radio condition in this area of the cell 200.

Thus, in accordance with examples of the inventive approach described herein, the base station 202 broadcasts one or more tuples of geographic coordinates and RRM configuration parameter values to all potential users in the cell 200. Mathematically, the i-th RRM configuration message at time t may be expressed as tuples $(x_{i,t}, c_{i,t})$, where $x_{i,t}$ is a coordinate vector that describes a particular geographic position or region which may be referred to as a configuration location, and $c_{i,t}$ is a vector of RRM configuration settings for the coordinate $x_{i,t}$. The tuples may be broadcast, for example, using dedicated channels for control information that are available in accordance with a cellular communication standard, like the LTE PPCH. An advantage of the inventive approach is that the amount of data transmitted may be adapted to the available resources for the respective control channels. The tuples control messages, in accordance with examples, are not necessarily sent closely spaced in time, and the granularity of the grid of coordinates is also not fixed. For example, in delay tolerant applications, a UE may wait until settings corresponding to a nearby location are received. If delay is an issue, the UE may use a setting from the closest received location. In accordance with other examples, the UE may extrapolate control parameters based on control messages already received and decoded, for example by using a machine learning tool.

The geometric information about the system state around the base station is provided, for example, by radio maps. Radio maps may be generated using machine learning techniques using readily available RRM measurements and user location information, as it is described, for example in reference [3]. The UEs need knowledge of their own position. In accordance with examples, the UEs may be equipped with a GPS receiver and/or the location of a UE may be determined using a mobile radio cellular positioning protocol, like the location position in protocol LPP.

With reference to FIGS. 2 and 3 one example of the inventive approach has been described, however, the invention is not limited to this example. In accordance with other examples, rather than providing location information describing the entire area, like area $L_1$, only specific points in the cell 200, like location $x_{L1}$ (see FIG. 2) may be provided. UEs within the cell 200 may determine on the basis of their location and on the basis of a distance to the coordinate $X_{L1}$ whether the parameter set A is to be used or not. In accordance with further examples, rather than sending the parameter settings for the entire cell 200, i.e. for each of the areas/regions $L_1$ to $L_7$ or for each of the respective coordinates $x_{L1}$ to $x_{L7}$, the control messages for the different regions may be sent at different times. For example at a first time only one configuration message for one or more areas of the cell 200 is sent, and at a subsequent time instant another control message for one or more other areas is sent.

For example, at a first time, $t_i$ only the parameter set A may be transmitted together with the location information for areas/coordinates $L_1$ and $L_7$, and at a later time $t_{i+1}$ the information for the other areas or at least some of the other areas may be transmitted. In such a scenario, UEs running delay tolerant applications and determining that a currently transmitted control message is for a coordinate in a distance beyond a threshold, may wait until a configuration message is received for a location or area having a distance to the location opposition of the UE which is below the threshold. On the other hand, in case an application run on a UE does not allow for a delay or is delay-sensitive, the UE, despite the fact that the currently sent configuration message is for a region/area in which the UE is not located, i.e. the distance to the signaled coordinate is, for example, greater than a predefined threshold, the UE may decide to use the parameters indicated in this configuration message for the radio resource management. Alternatively, as mentioned above, in case the UE already received a number of control messages for areas around its location, it may use the respective parameters and extrapolate, on the basis of these received and decoded parameters its own radio resource management parameters to be used for communication in the communication network.

In accordance with further examples, the UE may take into consideration local information when deciding about the RRM parameter set to be used. Such local information may not be available at the base station and may include information about the environment in which the UE is currently located or about the position at which the UE will be located once a communication with the network is started.

For example, the UE may have knowledge about its environment, e.g. the topology around the UE. Based on this knowledge, the UE may determine that a radio connection from the UE's position to the closest location indicated in the control message is likely to have a reduced or bad quality such as a bad channel condition, e.g., because there is no line of sight connection possible to the closest location due to obstacles, like buildings. In such a case, the UE may select the RRM parameter set associated with a more remote location to which, however, a line of sight connection exists.

In accordance with another example, the UE may be a mobile UE that is currently moving in the cell. The UE may determine a direction and speed of the movement so that it has knowledge about an estimated position at which the UE will be once the actual communication starts, i.e., at what position the UE will be once the connection set up has been completed. On the basis of this knowledge the UE may select from the control message the RRM parameter set associated with a location closest to the estimated position, rather than the RRM parameter set associated with a location closest to the current position of the UE.

In the examples of FIGS. 2 and 3, the respective regions/ areas having associated therewith the different RRM parameters A to C are shown as being separated from each other, however, this is only a schematic representation, and in accordance with examples, the L1 to L7 may have an overlap, and the UE within the cell 200 may determine on the basis of its own position and a distance to the coordinates indicated in the control message which of the RRM parameters from the signaled set, associated with the respective areas, is to be used.

Thus, in accordance with the examples of the present invention, at certain points in time, the base station 200 broadcasts the geographic control information that is received by all users in the cell 200, for example by broadcasting the control information using the PBCH or any other existing channel for control information. The broadcast control information may comprise a variable number of configuration messages, and each configuration message 300 includes a combination of a coordinate vector 302 identifying a certain geographic region or location within the cell 200, and a vector 304 of radio resource management parameters associated with this specific coordinate/area. The configuration messages may be sent at varying time intervals and with varying distance between the respective coordinates, dependent on the resources available within the cell 200 to perform the signaling of the control information. In other words, in the example of FIGS. 2 and 3, varying distances between the coordinates may mean that in case the available resources for control information transmission is reduced, also the number of coordinates is reduced so that the number of areas in the cell 200 having associated therewith different RRM parameters is also reduced. On the other hand, in case more resources are available for signaling, more areas may be defined, i.e. the granularity may be increased.

The control locations and the distances from each other may be chosen by the base station based on the radio maps that map geographic coordinates to information about the system state, for example, the radio propagation conditions. Based on the radio maps, the base station may identify regions of similar conditions, like regions $L_1$, $L_7$, areas $L_4$, $L_6$ and areas $L_2$, $L_3$ and $L_5$ so that for such identified regions, the transmit configuration information may be the same.

Based on its position, the UE may choose which particular configuration to apply, for example the configuration vector within the configuration message that is closest to its position. UEs that do not have knowledge about their position may ignore the geographic RRM configuration information and apply the procedures currently used in accordance with mobile communication standards for gathering the RRM parameter information.

Figure 4:
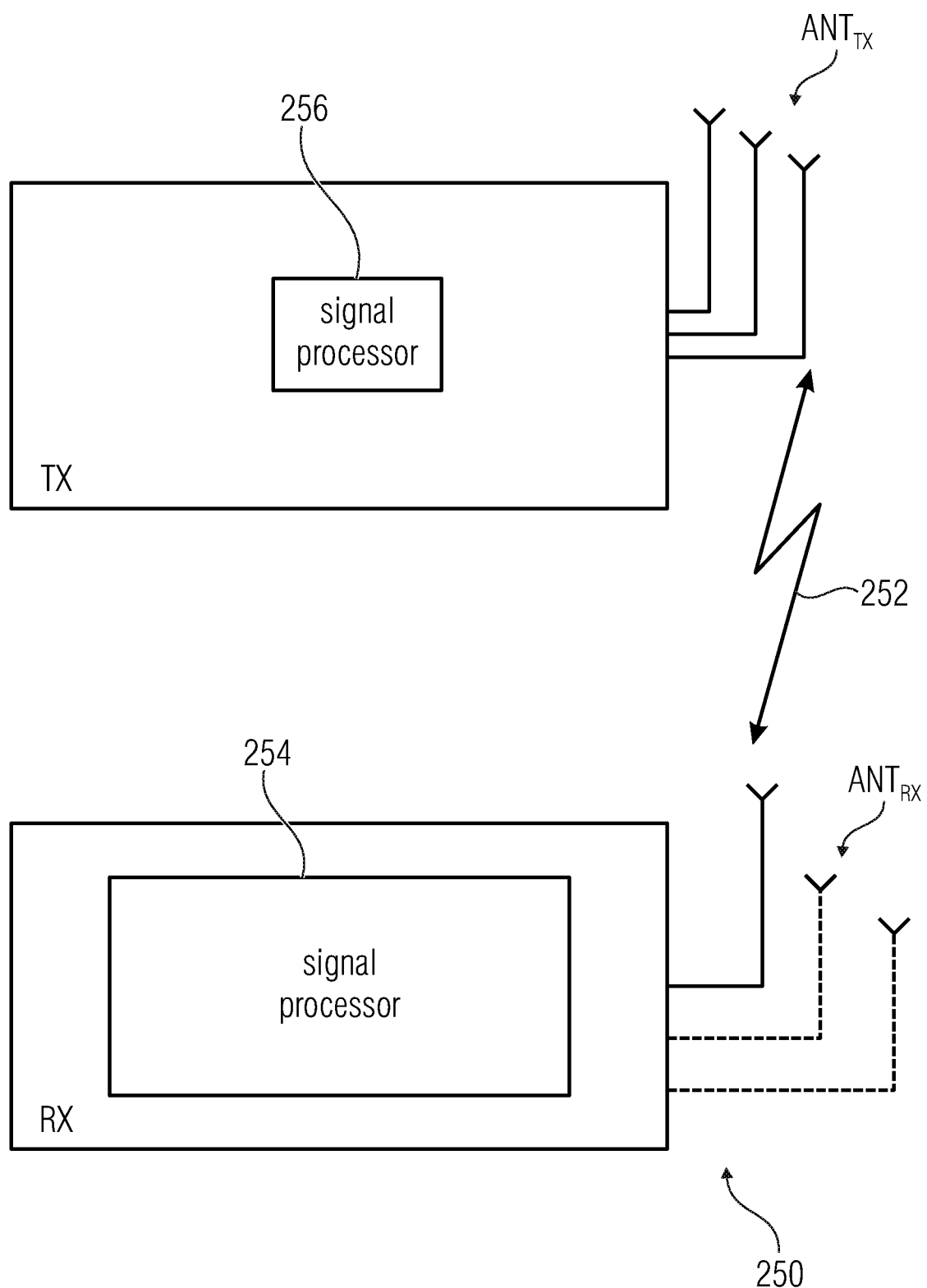
FIG. 4 is a schematic representation of a wireless communication system for transmitting information from a transmitter to a receiver.

Embodiments of the present invention may be implemented in a wireless communication system as depicted in FIG. 1 including base stations, users, like mobile terminals or IoT devices. FIG. 4 is a schematic representation of a wireless communication system 400 for communicating information between a transmitter TX and a receiver RX. The transmitter TX includes one or more antennas $ANT_{TX}$ or an antenna array having a plurality of antenna elements. The receiver RX includes one or more antennas $ANT_{RX}$. As is indicated by the arrow 402 signals are communicated between the transmitter TX and the receiver RX via a wireless communication link, like a radio link. The wireless communication system may operate in accordance with the techniques described herein.

For example, the receiver RX receives via the one or more antennas $ANT_{RX}$ a radio signal broadcast by the transmitter TX. The transmitter TX serves a cell of the wireless communication network in which the receiver RX is located. The radio signal has a plurality of configuration messages, and each configuration message includes information defining at least one location in the cell and parameters for a communication of the receiver with the wireless communication network, the parameters being associated with the certain location. The receiver RX includes a signal processor 404 to determine the parameters for the communication of the receiver RX with the wireless communication network using a position of the receiver RX in the cell and the plurality of configuration messages. The transmitter TX comprises a signal processor 406 to generate the radio signal which has the plurality of configuration messages. Each of the configuration messages includes the information defining the at least one location in the cell and the parameters for the communication of the receiver RX with the wireless communication network. The parameters are associated with the certain location. The transmitter TX serves the receiver RX in the cell of the wireless communication network and broadcasts the radio signal to the receiver RX.

Figure 5:
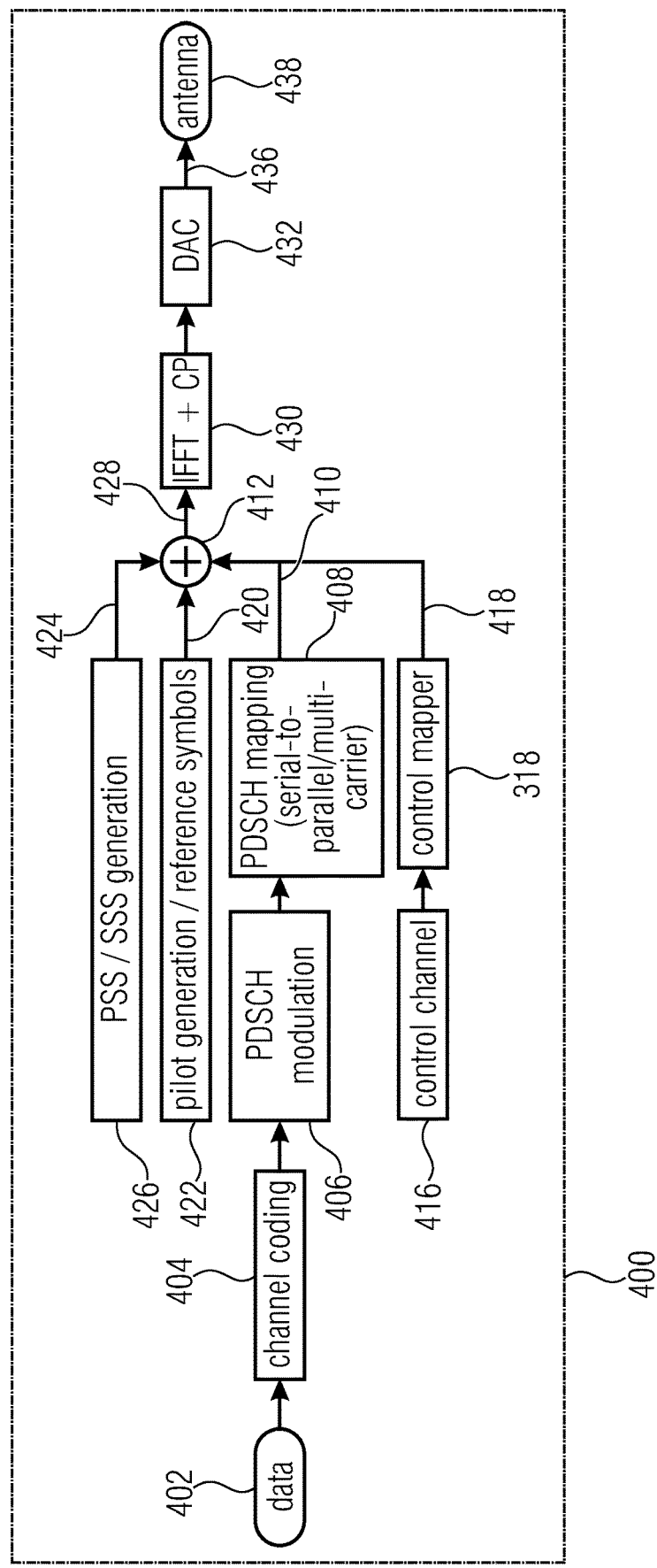
FIG. 5 is a schematic representation of transmitters in a wireless communication system for transmitting control data to receivers in accordance with embodiments.

FIG. 5 is a block diagram of a transmitter 400 in a wireless communication system for transmitting information to a receiver in accordance with embodiments described above. The transmitter 400 receives data 402 that is encoded by the channel encoder 404, modulated by the modulator 406 and mapped to multiple carriers by the mapper 408. The signal 410 is combined at 412 with control signals 414 provided by the control channel unit 416 and the control mapper 418, with pilot symbols 420 from the pilot symbol generator 422, and with PSS/SSS signals 424 from the PSS/SSS signal generator 326. The combined signal 428 is provided to the IFFT+CP block 430, is converted by the DAC 432 into the analog domain. The analog signal 436 is processed for radio transmission and eventually transmitted by the antenna 438. In accordance with embodiments, the inventive aspects may be implemented using the control channel unit 416 and the control mapper 418 to generate the plurality of configuration messages to be broadcast using the radio signal. The control channel unit 416 and the control mapper 418 generate the configuration messages so that they include the information defining the at least one location in the cell and the location dependent parameters for the communication of a receiver with the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Sesia, Stefania, Matthew Baker, and Issam Toufik, "LTE—The UMTS Long Term Evolution: From Theory to Practice", John Wiley & Sons, 20111.
[2] R. Di Taranto, S. Muppirisetty, R. Raulefs, D. Slock, T. Svensson and H. Wymeersch, "Location-Aware Communications for 5G Networks: How location information can improve scalability, latency and robustness of 5G", in IEEE Signal Processing Magazine, vol. 31, no. 6, pp. 102-112, November 2014.
[3] M. Kasparick, R. L. G. Cavalcante, S. Valentin, S. Stanczak, and M. Yukawa, "Kernel-Based Adaptive Online Reconstruction of Coverage Maps With Side Information", in IEEE Transactions on Vehicular Technology, 2015, doi: 10.1109/TVT.2015.2453391 (accepted for publication).

The invention claimed is:
1. A receiver, wherein
the receiver is configured to receive a radio signal broadcast by a transmitter of a wireless communication network, the transmitter serving a cell of the wireless communication network in which the receiver is located,
the radio signal comprises a plurality of configuration messages, each configuration message comprising information defining at least one geographical location or area in the cell and parameters to be used for a communication with the wireless communication network, when the receiver is at the at least one geographical location or area, the UE is configured to select the parameters for the communication with the wireless communication network from one or more of the plurality of configuration messages comprising at least one geographical location or area corresponding to a geographical position of the receiver in the cell, the receiver is configured to receive, at a first time, a first radio signal and, at a second time, which is different from the first time, a second radio signal, the first radio signal comprising one or more configuration messages for one or more first geographical locations or areas, and the second radio signal comprising one or more configuration messages for one or more second geographical locations or areas, which is different from the first geographical locations or areas, wherein the receiver is configured to determine whether a currently transmitted configuration message is for a geographical location or area at a distance from the receiver that is beyond a threshold, and wherein, in case the currently transmitted configuration message is for a geographical location or area at a distance beyond the threshold, the receiver is configured to:

in case an application of a first type is running on the receiver, wait until a configuration message is received for a geographical location or area at a distance from the receiver which is below the threshold, or in case an application of a second type is running on the receiver, use parameters in the currently transmitted configuration message.

2. The receiver of claim 1, configured to set the radio communication parameters for a communication with wireless communication network according to the parameters selected.

3. The receiver of claim 1, configured to determine the geographical position of the receiver relative to the at least one geographical location or area indicated in the configuration message, and to select the parameters from the configuration message comprising at least one geographical location or area to which a distance of the receiver is equal to or less than a predefined threshold.

4. The receiver of claim 3, configured to select the parameters from the configuration message comprising at least one geographical location or area being closest to the geographical position of the receiver, when the distance of the receiver to the at least one geographical location or area indicated in the configuration message is greater than a predefined threshold and when the receiver needs to quickly setup a connection with the wireless communication network.

5. The receiver of claim 1, configured to determine the parameters by extrapolating parameters from a plurality of configuration messages received and decoded by the receiver.

6. The receiver of claim 1, configured to determine the parameters further on the basis of local information.

7. The receiver of claim 6, wherein the local information comprises information about the environment in which the receiver is currently located or information about a geographical position at which the receiver will be located once a communication with the network is started.

8. The receiver of claim 1, comprising a satellite receiver configured to determine the geographical position of the receiver using a satellite based positioning system.

9. The receiver of claim 1, configured to determine the geographical position of the receiver using a mobile radio cellular positioning protocol.

10. The receiver of claim 1, wherein the plurality of configuration messages are received at the same time or at different times.

11. The receiver of claim 1, wherein a plurality of the geographical locations or areas in the cell have associated therewith the same parameters for the communication with the wireless communication network.

12. The receiver of claim 1, wherein the parameters for the communication with the wireless communication network comprise one or more of transmit power, user allocation, beamforming, data rates, handover criteria, modulation scheme, error coding scheme.

13. The receiver of claim 12, wherein the parameters comprise radio resource management, RRM control parameters.

14. A wireless communication network, comprising:
a receiver of claim 1; and
a transmitter,
wherein the transmitter is configured to broadcast a radio signal to one or more receivers in a cell of a wireless communication network, the transmitter serving the cell of the wireless communication network in which the receivers are located, wherein the radio signal comprises a plurality of configuration messages, each configuration message comprising information defining at least one geographical location or area in the cell and parameters to be used for a communication of a receiver with the wireless communication network, when the receiver is at the at least one geographical location or area, and wherein the transmitter is configured to transmit, at a first time, a first radio signal and, at a second time, which is different from the first time, a second radio signal, the first radio signal comprising one or more configuration messages for one or more first geographical locations or areas, and the second radio signal comprising one or more configuration messages for one or more second geographical locations or areas, which is different from the first geographical locations or areas.

15. The wireless communication network of claim 14, wherein the wireless communication network comprises a cellular network, a wireless local area network or a wireless sensor system.

16. The wireless communication network of claim 15, wherein the receiver is a mobile terminal and the transmitter is a base station of a cellular network.

17. The wireless communication network of claim 16, wherein the cellular network uses an Inverse Fast Fourier Transform, IFFT, based signal.

18. The wireless communication network of claim 17, wherein the Inverse Fast Fourier Transform, IFFT, based signal comprises Orthogonal Frequency Division Multiplex, OFDM, with cyclic prefix, CP, Discrete Fourier Transform spread Orthogonal Frequency Division Multiplex, DFT-s-OFDM, with cyclic prefix, CP, Inverse Fast Fourier Transform, IFFT, based waveforms without cyclic prefix, CP, filtered Orthogonal Frequency Division Multiplex, f-OFDM, Filter Bank Multi-Carrier, FBMC, Generalized Frequency Division Multiplexing, GFDM, or Universal Filtered Multi-Carrier, UFMC.

19. A method, comprising:
receiving, by a receiver of a wireless communication network, a radio signal broadcast by a transmitter of the wireless communication network, the transmitter serving a cell of the wireless communication network in which the receiver is located, wherein the radio signal comprises a plurality of configuration messages, each configuration message comprising information defining at least one geographical location or area in the cell and parameters to be used for a communication with the wireless communication network, when the receiver is at the at least one geographical location or area, and selecting, by the receiver, the parameters for the communication with the wireless communication network from one or more of the plurality of configuration messages comprising at least one geographical location or area corresponding to a geographical position of the receiver in the cell, wherein receiving the radio signal comprises receiving, at a first time, a first radio signal and, at a second time, which is different from the first time, a second radio signal, the first radio signal comprising one or more configuration messages for one or more first geographical locations or areas, and the second radio signal comprising one or more configuration messages for one or more second geographical locations or areas, which is different from the first geographical locations or areas, wherein the method further comprises
determining, by the receiver, whether a currently transmitted configuration message is for a geographical location or area at a distance from the receiver that is beyond a threshold, and
in case the currently transmitted configuration message is for a geographical location or area at a distance beyond the threshold,
in case an application of a first type is running on the receiver, causing the receiver to wait until a configuration message is received for a geographical location or area at a distance from the receiver which is below the threshold, or
in case an application of a second type is running on the receiver, causing the receiver to use parameters in the currently transmitted configuration message.

20. A method, comprising:
broadcasting, by a transmitter of a wireless communication network, a radio signal to one or more receivers in a cell of the wireless communication network, the transmitter serving the cell of the wireless communication network in which the receivers are located, wherein the radio signal comprises a plurality of configuration messages, each configuration message comprising information defining at least one geographical location or area in the cell and parameters to be used for a communication of a receiver with the wireless communication network, when the receiver is at the at least one geographical location or area;
receiving, by a receiver of the wireless communication network, the radio signal broadcast by the transmitter; and
selecting, by the receiver, the parameters for the communication with the wireless communication network from one or more of the plurality of configuration messages comprising at least one geographical location or area corresponding to a geographical position of the receiver in the cell and the plurality of configuration messages,
wherein receiving the radio signal comprises receiving, at a first time, a first radio signal and, at a second time, which is different from the first time, a second radio signal, the first radio signal comprising one or more configuration messages for one or more first geographical locations or areas, and the second radio signal comprising one or more configuration messages for one or more second geographical locations or areas, which is different from the first geographical locations or areas, wherein the method further comprises
determining, by the receiver, whether a currently transmitted configuration message is for a geographical location or area at a distance from the receiver that is beyond a threshold, and
in case the currently transmitted configuration message is for a geographical location or area at a distance beyond the threshold,
in case an application of a first type is running on the receiver, causing the receiver to wait until a configuration message is received for a geographical location or area at a distance from the receiver which is below the threshold, or
in case an application of a second type is running on the receiver, causing the receiver to use parameters in the currently transmitted configuration message.

21. A non-transitory digital storage medium having a computer program stored thereon to perform, when said computer program is run by a computer, the method, comprising:
broadcasting, by a transmitter of a wireless communication network, a radio signal to one or more receivers in a cell of the wireless communication network, the transmitter serving the cell of the wireless communication network in which the receivers are located,
wherein the radio signal comprises a plurality of configuration messages, each configuration message comprising information defining at least one geographical location or area in the cell and parameters to be used for a communication of a receiver with the wireless communication network, when the receiver is at the at least one geographical location or area,
wherein receiving the radio signal comprises receiving, at a first time, a first radio signal and, at a second time, which is different from the first time, a second radio signal, the first radio signal comprising one or more configuration messages for one or more first geographical locations or areas, and the second radio signal comprising one or more configuration messages for one or more second geographical locations or areas, which is different from the first geographical locations or areas, wherein the method further comprises
determining, by the receiver, whether a currently transmitted configuration message is for a geographical location or area at a distance from the receiver that is beyond a threshold, and
in case the currently transmitted configuration message is for a geographical location or area at a distance beyond the threshold,
in case an application of a first type is running on the receiver, causing the receiver to wait until a configuration message is received for a geographical location or area at a distance from the receiver which is below the threshold, or
in case an application of a second type is running on the receiver, causing the receiver to use parameters in the currently transmitted configuration message.

22. A non-transitory digital storage medium having a computer program stored thereon to perform, when said computer program is run by a computer, the method, comprising:

broadcasting, by a transmitter of a wireless communication network, a radio signal to one or more receivers in a cell of the wireless communication network, the transmitter serving the cell of the wireless communication network in which the receivers are located, wherein the radio signal comprises a plurality of configuration messages, each configuration message comprising information defining at least one geographical location or area in the cell and parameters to be used for a communication of a receiver with the wireless communication network, when the receiver is at the at least one geographical location or area;

receiving, by a receiver of the wireless communication network, the radio signal broadcast by the transmitter; and selecting, by the receiver, the parameters for the communication with the wireless communication network from one or more of the plurality of configuration messages comprising at least one geographical location or area corresponding to a geographical position of the receiver in the cell and the plurality of configuration messages, wherein receiving the radio signal comprises receiving, at a first time, a first radio signal and, at a second time, which is different from the first time, a second radio signal, the first radio signal comprising one or more configuration messages for one or more first geographical locations or areas, and the second radio signal comprising one or more configuration messages for one or more second geographical locations or areas, which is different from the first geographical locations or areas, wherein the method further comprises
- determining, by the receiver, whether a currently transmitted configuration message is for a geographical location or area at a distance from the receiver that is beyond a threshold, and
- in case the currently transmitted configuration message is for a geographical location or area at a distance beyond the threshold,
- in case an application of a first type is running on the receiver, causing the receiver to wait until a configuration message is received for a geographical location or area at a distance from the receiver which is below the threshold, or
- in case an application of a second type is running on the receiver, causing the receiver to use parameters in the currently transmitted configuration message.

* * * * *